Figure 1:
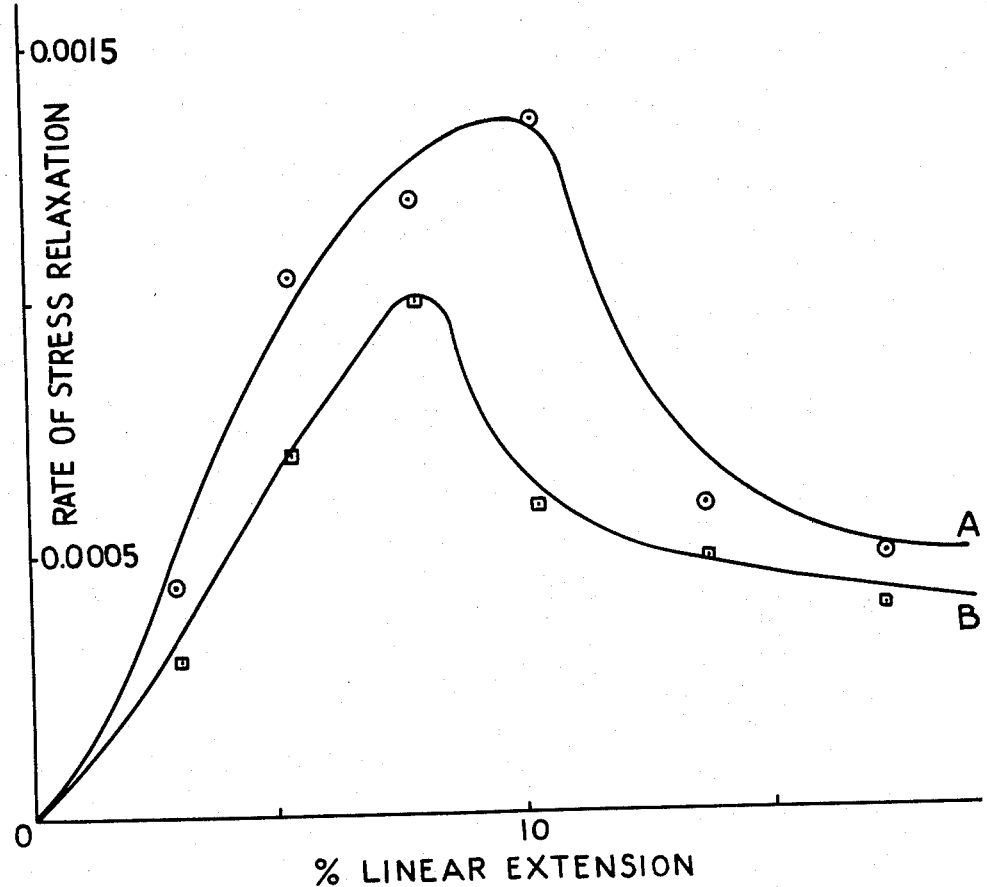

United States Patent Office 3,114,730
Patented Dec. 17, 1963

3,114,730
LOWER SECONDARY ALKYL ALKOXYANILINES AS RUBBER ANTIOZONANTS
Marion Ilse Hedwig Bethell, Bromborough, England, and Bertrand Ernest Wilde, deceased, late of Rose Lea, Pentre, Wrexham, Wales, by Marion Ilse Hedwig Bethell, administratrix, Bromborough, England, assignors to Monsanto Chemicals Limited, London, England, a British company
Filed Jan. 23, 1962, Ser. No. 169,168
Claims priority, application Great Britain Feb. 17, 1958
17 Claims. (Cl. 260—45.9)

This invention relates to antiozonants for rubber, particularly for instance to antiozonants which do not seriously discolor rubber stocks in which they are used and which are therefore suitable for use in white and other light-colored compositions.

It is well known that vulcanized rubber is liable to deteriorate on exposure to the action of heat, light and oxygen, and that deterioration occurs in the atmosphere under normal conditions of use. To resist this effect various substances have been proposed for addition to the rubber, and many effective rubber antioxidants are in use. Unfortunately a substance that is a rubber antioxidant does not necessarily give protection against other type of deterioration which can take place in rubber, that is to say that caused by the small quantities of ozone usually present in the atmosphere. In fact it is true to say that it is rare for a good rubber antioxidant to possess also a sufficiently useful antiozonant activity. The latter property is important as the surface cracking which occurs when rubber is subjected to distortion or extension is largely caused by the effect of previous exposure to ozone.

An effective new class of rubber antiozonants has now been discovered, the members of which do not seriously discolor light-colored rubber stocks. The new class are also effective rubber antioxidants.

The present invention comprises rubber in which there is incorporated as antiozonant a substituted aniline of the formula:

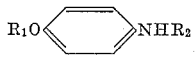

where $R_1$ is an aliphatic or an aralkyl group and $R_2$ is a 1-methyl-n-propyl, 1-ethyl-n-propyl, 1-methyl-n-butyl or isopropyl group, and where the benzene ring can also contain an inactive substituent, or a salt of one of these compounds with the proviso that when $R_2$ is isopropyl, $R_1$ contains six or more carbon atoms.

In general in the substtiued anilines of the formula:

when $R_1$ is an aliphatic group this is preferably an alkyl (either straight- or branched-chain) or a cycloalkyl group; thus $R_1$ can be methyl, ethyl, n- or isopropyl, n-, iso-, sec.- or tert.-butyl, amyl, n-hexyl, or 1-ethyl-n-butyl or 2-ethyl-n-butyl, n-heptyl or 1-methyl-n-hexyl, n-octyl or 1-methyl-n-heptyl, decyl, dodecyl or higher alkyl groups, or a cyclo-alkyl group such as for instance a cyclohexyl, methylcyclohexyl or cyclopentyl group. If $R_1$ is an aralkyl group this can be for instance a benzyl group or an alkyl substituted benzyl group. $R_2$ is preferably a 1-methyl-n-propyl group or an isopropyl group but can be a 1-ethyl-n-propyl group or a 1-methyl-n-butyl group. When $R_2$ is an isopropyl group, $R_1$ is either aralkyl or an alkyl group containing at least six carbon atoms which alkyl group is preferably branched. Where the benzene ring contains an inactive substituent, in addition to the groups $R_1O-$ and $-NHR_2$, this can for example be a hydrocarbon group, particularly for instance an alkyl group, such as a methyl, ethyl or propyl group. Preferably at least one position in the benzene ring ortho- to the amino group is vacant.

4-methoxy-N-(1'-methyl-n-propyl)aniline, 4-ethoxy-N-(1'-methyl - n - propyl)aniline, 4-n-hexyloxy-N-(1'-methyl-n-propyl)aniline, N-isopropyl-4-(n-octyloxy)aniline, N-isopropyl-4-(2-ethyl-n-butoxy)aniline and N-isopropyl-4-(1-methylheptyloxy)aniline, and their salts, are new compounds.

In general, salts of the substituted anilines which can be used are the acid-addition salts formed by treating the free base with an acid such as hydrochloric acid, or for instance an organic acid such as acetic or stearic acid. Also suitable are the quaternary ammonium salts, such as the quaternary chlorides obtained by treating the free base with an alkyl chloride.

The substituted anilines can be prepared by reductive alkylation of the appropriate amine:

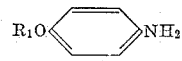

(or a precursor, for instance the nitro compound:

or an azo or hydrazo derivative, capable of reduction to the required amine) in the presence of methyl ethyl ketone or methyl n-propyl ketone. The reductive alkylation is preferably carried out by means of hydrogen and a hydrogenation catalyst, for example a catalyst comprising platinum deposited on carbon.

The amount of the substituted aniline used in the rubber can vary between wide limits, but in general it has been found preferable to use from 0.2 to 3 parts by weight, and particularly from 0.5 to 2 parts by weight, per hundred parts by weight of rubber used. Amounts somewhat outside these limits can sometimes be employed, for instance from 0.1 to 5 parts of the antiozonant per 100 parts of rubber. Very satisfactory results have been obtained using about 1 part by weight of the antiozonant per hundred parts by weight of rubber.

The substituted anilines of the invention are effective antiozonants for both natural and synthetic rubbers. Synthetic rubbers which can be used include polymers of 1,3-butadienes, for instance 1,3-butadiene itself, and copolymers of 1,3-butadienes with other monomers, such as styrene, acrylonitrile, isobutylene or methyl methacrylate.

An indication of the non-discoloring properties in rubber of the substituted anilines of the invention was obtained by measuring the light stability of solutions of the compounds in the following way.

A solution of each of the compounds in pure propylene tetramer (an olefinic material likely to cause discoloration of the type that takes place in rubber) was made up of concentration 0.008 mol. per litre and placed in a loosely corked Pyrex test tube. These solutions were exposed to daylight together with as a control a similarly prepared solution of a commercially available antioxidant known to have excellent nondiscoloring properties in rubber, although it possessed no antiozonant activity whatsoever. At intervals of a few days the intensities of the colors developed in the solutions were compared by measuring the light absorption of each one at a wavelength of 4260 A. using an EEL photometer (1 cm. cell; filter 601). Exposure to daylight was continued until the percentage absorption by the control solution (containing the commercial non-discoloring antioxidant) reached 50%. The percentage absorption of each of the test solutions was of course also measured. The value of the 4-methoxy- and 4-ethoxy-N-(1'-methyl-n-propyl)anilines as non-discoloring additives was illustrated by the fact that the ratios of the percentage absorption of the test solution to the percentage absorption of the control solution were 0.9 and 1.0 respectively after the same exposure, indicating that the two substituted anilines, which were excellent antizonants, had acceptable properties from the discoloration point of view.

The invention is illustrated by the following examples:

EXAMPLE 1

This example describes the preparation of the new compound 4-ethoxy-N-(1'-methyl-n-propyl)aniline by the reductive alkylation of p-phenetidine with methyl ethyl ketone.

205 grams of p-phenetidine were mixed with 324 grams of methyl ethyl ketone and 2.05 grams of a catalyst composed of carbon on which was supported 5% by weight of platinum. The mixture was heated with stirring at about 100° C. for three hours in the presence of hydrogen under pressure; the pressure commenced at 350 pounds per square inch and as it fell to 150 during the hydrogenation, as it did several times, more hydrogen was added to raise the pressure again to 350 pounds per square inch. The mixture was cooled and filtered from the residual catalyst. The unreacted methyl ethyl ketone was removed by distillation under atmospheric pressure and the desired compound obtained by fractional distillation of the residue under reduced pressure. There were thus obtained 230 grams of 4-ethoxy-N-(1'-methyl-n-propyl)aniline having a boiling point of 118° C. under a pressure of 2 mm. of mercury.

EXAMPLE 2

4-methoxy-N-(1'-methyl-n-propyl)aniline was prepared using the same process described in Example 1 except that p-anisidine was employed as starting material in place of the p-phenetidine. The resulting 4-methoxy-N-(1'-methyl-n-propyl)-aniline was a liquid of boiling point 112–113° C. under a pressure of 2 mm. of mercury.

EXAMPLE 3

This example describes the preparation of the new compound 4-n-hexyloxy-N-(1'-methyl-n-propyl)aniline by the reductive alkylation of 4-n-hexyloxyaniline with methyl ethyl ketone.

250 grams of methyl ethyl ketone were mixed with 100 grams of 4-n-hexyloxyaniline and 5 grams of a catalyst composed of carbon on which was supported 5% by weight of platinum. The charge was hydrogenated at 500 pounds per square inch and up to 150° C. until theory hydrogen had been absorbed. The mixture was then filtered and the excess ketone removed by distillation. The desired compound was obtained by fractional distillation of the residue under reduced pressure. There were thus obtained 96 grams of 4-n-hexyloxy-N-(1'-methyl-n-propyl)-aniline having a boiling point of 177–179° C. under a pressure of 2 mm. of mercury.

EXAMPLE 4

This example illustrates the use of 4-ethoxy-N-(1'-methyl-n-propyl)aniline as an antiozonant in a black rubber stock, and compares its activity with 4-ethoxy-N-n-butylaniline.

A rubber stock of the following composition was compounded on a laboratory mill:

| | Parts by weight |
|---|---|
| Smoked sheets | 100 |
| Carbon black | 50 |
| Mineral oil based processing agent (Tackol 2) | 3 |
| Zinc oxide | 5 |
| Stearic acid | 3 |
| Sulfur | 2.5 |
| N-cyclohexyl-2-benzthiazylsulfenamide | 0.4 |

One stock was made up with the addition of 3 parts by weight of 4-ethoxy-N-(1'-methyl-n-propyl)aniline and another with 3 parts of 4-ethoxy-N-n-butylaniline.

Portions of each stock were molded into the shape of a rubber band and vulcanized by heating at 141.5° C. for 30 minutes. The resulting band-shaped test pieces were roughly rectangular, with rounded ends and internal dimensions of 3 inches by 5/8 inch; they were 4 mm. wide and 1 mm. thick.

The antiozonant activity imparted to the stocks was measured by means of the test described below.

The basis of the test is the fact that the presence of surface cracks owing to the effect of ozone in a stretched sample of rubber causes a rapid relaxation of the stress present in the sample. The effect as an antiozonant of a substance can therefore be estimated by measuring the rates of stress relaxation of a sample of rubber treated with the substance to be tested. The stress relaxation rates are measured for a series of static linear extensions.

The apparatus employed was essentially that described for measurement of antioxidant activity by Robinson and Vodden in "Industrial and Engineering Chemistry" (1955), vol. 47, page 1477. However, the apparatus was operated at room temperature instead of 110° C., and in an atmosphere of air containing traces of ozone (about 7 parts per million) instead of an atmosphere of air alone.

In carrying out a test one of the band-shaped test pieces was extended on the two pulleys of the apparatus to a constant percentage extension and the stress noted that was necessary to maintain this. The stress was found to decrease in a logarithmic relationship with time. Measurements were made at different degrees of extension and a graph plotted of rate of stress relaxation against static percentage linear extension.

The graphs obtained for stocks treated with 4-ethoxy-N-(1'-methyl-n-propyl)aniline and 4-ethoxy-N-n-butylaniline respectively are shown in FIGURE I.

It will be seen that in each instance the rate of cracking of the rubber stock (as measured by rate of stress relaxation) passes through a maximum value at approximately 10% linear extension, but that the peak activity of the stock treated with 4-ethoxy-N-(1'-methyl-n-propyl)aniline is lower than that of the stock treated with the N-n-butyl analogue. The 4-ethoxy-N-(1'-methyl-n-propyl)aniline is accordingly the superior antiozonant.

A similar stock containing no additive at all gave rise to a curve of the same general type shown in FIGURE I, but the peak activity was very much higher. It did however again occur at approximately a 10% linear extension, and a measure of absolute antiozonant activity could be obtained by calculating the "peak ratio," that is the ratio of the peak rate of stress relaxation for the control stock to the peak rate of each of the treated stocks. Expressed in this way the peak ratio for the 4-ethoxy-N-(1'-methyl-n-propyl)aniline was 6.0 while that for the n-butyl analogue was only 4.4, again demonstrating the improved performance of the 4-ethoxy-N-(1'-methyl-n-propyl)aniline.

EXAMPLE 5

This example also demonstrates the antiozonant activity of 4-ethoxy-N-(1'-methyl-n-propyl)aniline, but the activity is compared against an established commercial antiozonant (6-ethoxy-2,2,4-trimethyl-1,2-dihydroquinoline).

Using the rubber stock and the procedure described in Example 4 stocks were made up containing three parts by weight of the commercial antiozonant and the test substance respectively.

The stocks were formed into test pieces, vulcanized and tested for antiozonant properties also as described in Example 4; the graphs obtained were similar in principle to those of Example 4, with the peaks occurring at about a 10% linear extension.

However, in this instance in expressing the results the peak ratio was taken as the ratio of the peak rate of stress relaxation for the stock containing the commercial antiozonant to the peak rate of the treated stock containing the 4-ethoxy-N-(1'-methyl-n-propyl)aniline. Expressed in this way the peak ratio was 4.0, indicating the number of times the substituted aniline was better than the commercial antiozonant it was compared with.

EXAMPLE 6

This example illustrates the use of 4-ethoxy-N-(1'-methyl-n-propyl)aniline as an antiozonant in a synthetic rubber stock, and again compares it with the commercial antiozonant of Example 5.

A rubber stock of the following composition was compounded on a laboratory mill:

| | Parts by weight |
|---|---|
| Snythetic rubber | 100 |
| Carbon black | 50 |
| Zinc oxide | 4 |
| Stearic acid | 2 |
| Mineral oil based processing agent (Tackol 2) | 8 |
| Sulfur | 2 |
| N-cyclohexyl-2-benzthiazylsulfenamide | 1.2 |

The synthetic rubber was a GR–S styrene-butadiene copolymer sold as Krylene NS.

The stock was first made up with the addition of 3 parts by weight of the commercial antiozonant, and then a stock was made up with the addition of 3 parts by weight of the substance to be tested. Band-shaped test pieces were then prepared as described in Example 4, and the antiozonant properties given to the stocks were found also as described in that example; the graphs obtained were similar in principle to those of Example 4, and again the peaks occurred at about a 10% linear extension.

However, as in Example 5, in calculating the "peak ratio" the peak rate of stress relaxation for the commercial antiozonant stock was compared with the peak rate for the treated stock. The peak ratio was found to be 3.7, which again indicated a significant superiority for the 4-ethoxy-N-(1'-methyl-n-propyl)aniline compared with the commercial antiozonant.

EXAMPLE 7

This example describes the preparation of the new compound N-isopropyl-4-(1-methylheptyloxy)aniline. The amine employed in this example, namely 4-(2-octyloxy)nitrobenzene, was obtained by slowing adding with stirring over a 15-minute period 161 grams (2.44 moles) of 85% potassium hydroxide to 334 grams (2.4 moles) of p-nitrophenol dissolved in 1200 ml. of dimethylformamide. After the addition of potassium hydroxide, the temperature was brought to 90–100° C. to obtain a homogeneous solution and 50 ml. of dimethylformamide-water solution stripped off under vacuum. The mixture was then heated to 100–110° C., 500 grams (2.59 moles) of 2-bromooctane fed in over a 50 minute period and the reaction continued at this temperature for an additional 2 hours. The product was then decanted into a 6-liter separatory funnel containing 1 liter of 10% sodium hydroxide and 600 ml. of benzene to aid separation. The product solution was then washed twice with water (1 liter each time), with 5% sodium hydroxide (1 liter), with 1 liter of water, with 1 liter of 4% hydrochloric acid and with 1 liter of water, then dried over 100 grams of sodium sulfate. Benzene was removed by stripping to 100° C./20 mm. and the resulting crude product vacuum distilled. Material distilling at 183–187° C./4.6 mm. was collected. The yield was 343 grams or 57% of theory.

100 grams of 4-(2-octyloxy)nitrobenzene obtained as described in the preceding paragraph were mixed with 200 grams of acetone and 3 grams of a catalyst composed of carbon on which was supported 5% by weight of palladium. The mixture was charged into a Parr pressure reaction apparatus and the bomb purged with hydrogen. The system was then placed under 300 pounds per square inch of hydrogen with no external heat applied. After 100 pounds per square inch had been absorbed in 5 minutes, the pressure was increased to 500 pounds per square inch. As additional hydrogen was absorbed, the pressure was again increased to 500 pounds per square inch. The reaction was discontinued after 80% theory hydrogen had been taken up. The catalyst was filtered off and the filtered mixture stripped of acetone (plus water of reaction) to 100° C./55 mm. The residue was distilled and the fraction boiling at 174–175° C./3 mm. collected. After filtering through a heavy pad of Attapulgus clay, N-isopropyl-4-(1-methylheptyloxy)aniline was obtained in 72% yield as a light amber liquid. Analysis gave 5.18% nitrogen compared to a calculated value of 5.33% for $C_{17}H_{29}NO$.

EXAMPLE 8

N-isopropyl-4-n-octyloxyaniline was prepared by using a similar procedure as described in Example 7 except that 4-n-octyloxyaniline was employed as starting material and 250 grams of acetone employed. The resulting N-isopropyl-4-n-octyloxyaniline was a yellow liquid boiling at 195–197° C. under a pressure of 7 mm. of mercury.

EXAMPLE 9

N-isopropyl-4-(2-ethyl-n-butoxy)aniline was prepared from 50 grams of 2-ethyl-n-butoxyaniline, 200 grams of acetone, 5 grams of a catalyst composed of carbon on which was supported 5% by weight of palladium. The resulting N-isopropyl-4-(2-ethyl-n-butoxy)aniline was a yellow liquid boiling at 154–155° C. under a pressure of 2 mm. of mercury.

EXAMPLE 10

This example illustrates the use of N-isopropyl-4-(1-methylheptyloxy)aniline and N-isopropyl-4-(2-ethyl-n-butoxy)aniline as antiozonants in a black rubber stock and compares their activity with a commercial antiozonant.

Rubber stocks were compounded comprising:

| Stock | A | B | C |
|---|---|---|---|
| | Parts by weight | | |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Hydrocarbon oil softener | 3 | 3 | 3 |
| Sulfur | 2.5 | 2.5 | 2.5 |
| Accelerator | 0.5 | 0.5 | 0.5 |
| Commercial antiozonant | 1.5 | | |
| N-isopropyl-4-(1-methylheptyloxy)-aniline | | 1.5 | |
| N-isopropyl-4-(2-ethyl-n-butoxy)-aniline | | | 1.5 |

The stocks were cured in the usual manner by heating in a press for 45 minutes at 144° C. and test portions thereof subjected to exposure cracking. (The apparatus and procedure employed is described by Creed et al. in Analytical Chemistry, vol. 25, page 241, February 1953.) The ozone rating was determined by assigning a value of 100 to stock A containing the commercial antiozonant. The results obtained were as follows.

*Table I*

| Stock: | Ozone rating |
|---|---|
| A | 100 |
| B | 101 |
| C | 104 |

N-isopropyl-4-n-octyloxyaniline is slightly less effective than the commercial material. The ozone rating in a similar stock was 92 as compared to 100 for the commercial control.

EXAMPLE 11

This example illustrates use in a synthetic rubber stock and again compares the compounds with a commercial antiozonant.

Rubber stocks were compounded comprising:

| Stock | D | E | F |
|---|---|---|---|
| | Parts by weight | | |
| Synethic rubber | 100 | 100 | 100 |
| Carbon black | 50 | 50 | 50 |
| Zinc oxide | 4 | 4 | 4 |
| Stearic acid | 2 | 2 | 2 |
| Saturated hydrocarbon | 10 | 10 | 10 |
| Sulfur | 1.75 | 1.75 | 1.75 |
| Accelerator | 1 | 1 | 1 |
| Commercial antiozonant | 1.5 | | |
| N-isopropyl-4-n-octyloxyaniline | | 1.5 | |
| N-isopropyl 4-(1-methylheptyloxy)aniline | | | 1.5 |

The synthetic rubber was a GR–S styrene-butadiene copolymer sold as GR–S 1500.

The stocks were cured in the usual manner by heating in a press for 60 minutes at 144° C. and ozone rating determined. The commercial antiozonant was assigned a value of 100. The results of the tests were as follows.

*Table II*

| Stock: | Ozone rating |
|---|---|
| D | 100 |
| E | 98 |
| F | 98 |

EXAMPLE 12

This example illustrates the resistance to discoloration of the antiozonants and compares their properties to N-cyclohexyl-p-phenetidine in the manufacture of white rubber goods.

Rubber stock of the following composition were compounded on a laboratory mill:

| | Parts by weight |
|---|---|
| Pale crepe rubber | 100 |
| Titanium dioxide | 50 |
| Hydrous aluminum silicate clay | 15 |
| Zinc oxide | 25 |
| Stearic acid | 1 |
| 2,2'-dithiobis(benzothiazole) | 0.6 |
| Diphenylguanidine | 0.15 |
| Sulfur | 3 |
| Antiozonant | 1.5 |

One stock was made up with the addition of N-cyclohexyl-p-phenetidine as antiozonant and others with the new antiozonants of this invention. Resistance to discoloration was evaluated on vulcanizates obtained by heating the stocks for 45 minutes at 145° C. Samples of the vulcanizates were exposed for 72 hours in a fadeometer. A carbon arc supplied the light. The percentage of light reflected from the surface of the samples after exposure was recorded. The increase in light reflectance as compared to the control stock containing N-cyclohexyl-p-phenetidine provides a measure of the superiority.

| Antiozonant | Increase in light Reflectance over control After 72 hours' exposure |
|---|---|
| N-sec.-butyl-p-phenetidine | 7 |
| N-isobutyl-p-phenetidine | −15 |
| N-isopropyl-p-phenoxyaniline | −30 |
| N-sec.-butyl-p-isopropoxyaniline | 13 |
| N-sec.-butyl-4-isobutoxyaniline | 19 |
| N-sec.-butyl-4-sec.-butoxyaniline | 19 |
| 4-n-pentyloxy-N-sec.-butylaniline | 10 |
| 4-isopentyloxy-N-sec.-butylaniline | 10 |
| N-sec.-butyl-4-(1-methylbutoxy)aniline | 9 |
| N-sec.-butyl-4-n-hexyloxyaniline | 15 |
| N-sec.-butyl-4-(2-ethyl-n-butoxy)aniline | 11 |
| N-isopropyl-4-(2-ethyl-n-butoxy)aniline | 15 |
| N-sec.-butyl-4-n-octyloxyaniline | 20 |
| N-isopropyl-4-n-octyloxyaniline | 5 |
| N-sec.-butyl-p-(1-methylheptyloxy)aniline | 18 |
| N-isopropyl-4-(1-methylheptyloxy)aniline | 12 |

It will be noted that the secondary alkyl alkoxyanilines are more resistant to discoloration than N-cyclohexyl-p-phenetidine which also has a secondary carbon attached to nitrogen. However, departure from the sec-alkyl configuration resulted in inferior properties. It was further observed that increased resistance to discoloration was not obtained with N-isopropyl-p-phenetidine but as explained above a minimum of six carbon atoms on the oxygen appears necessary.

In manufacture of rubber goods in which the product comes in contact with lacquered surfaces it is necessary to avoid ingredients which migrate and stain the lacquer during service. The antidegradants of this invention in which the alkoxy group contains at least six carbon atoms have little tendency to migrate from the rubber into the lacquered surface and are sufficiently non-staining to meet requirements for use in contact with nitrocellulose lacquers.

It is intended to cover all changes and modifications of the examples of the invention herein chosen for purposes of disclosure which do not constitute departures from the spirit and scope of the invention.

This application is a continuation-in-part of application Serial No. 793,525, filed February 16, 1959, now abandoned.

What is claimed is:

1. Sulfur vulcanizable diene rubber in which there is incorporated a small amount within the range of 0.1 to 5 parts by weight per 100 parts of rubber, sufficient to inhibit degradation, of an antidegradant of the structure

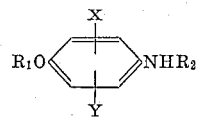

where $R_1$ is a member of a group consisting of an alkyl group of 1 to 12 carbon atoms, cyclohexyl, methylcyclohexyl, cyclopentyl, and benzyl, $R_2$ is a secondary alkyl group from the class consisting of 1-methyl-n-propyl, 1-ethyl-n-propyl, 1-methyl-n-butyl and isopropyl and X and Y are members of a group consisting of hydrogen and lower alkyl of 1 to 3 carbon atoms, with the proviso that when $R_2$ is isopropyl, $R_1$ contains at least six carbon atoms.

2. Sulfur vulcanizable diene rubber in which there is incorporated a small amount within the range of 0.1 to 5 parts by weight per 100 parts of rubber, sufficient to inhibit degradation, of an antidegradant of the structure

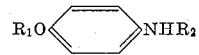

where $R_1$ is benzyl and $R_2$ is a secondary alkyl group containing at least four but not more than five carbon atoms.

3. Natural rubber in which there is incorporated a small amount within the range of 0.1 to 5 parts by weight per 100 parts of rubber, sufficient to inhibit degradation, of an antidegradant of the structure

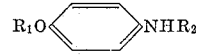

where $R_1$ is a higher alkyl group of six to twelve carbon atoms and $R_2$ is a secondary alkyl group containing at least three but not more than five carbon atoms.

4. Styrene-butadiene copolymer rubber in which there is incorporated a small amount within the range of 0.1 to 5 parts by weight per 100 parts of rubber, sufficient to inhibit degradation, of an antidegradant of the structure

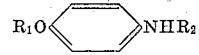

where $R_1$ is a secondary alkyl group of three to twelve carbon atoms and $R_2$ is a secondary alkyl group containing at least four but not more than five carbon atoms.

5. Sulfur vulcanizable diene rubber in which there is incorporated a small amount within the range of 0.1 to 5 parts by weight per 100 parts of rubber, sufficient to inhibit degradation, of 4-methoxy-N-(1'-methyl-n-propyl)aniline.

6. Sulfur vulcanizable diene rubber in which there is incorporated a small amount within the range of 0.1 to 5 parts by weight per 100 parts of rubber, sufficient to inhibit degradation, of 4-ethoxy-N-(1'-methyl-n-propyl)aniline.

7. Sulfur vulcanizable diene rubber in which there is incorporated a small amount within the range of 0.1 to 5 parts by weight per 100 parts of rubber, sufficient to inhibit degradation, of 4-n-hexyloxy-N-(1'-methyl-n-propyl)aniline.

8. Sulfur vulcanizable diene rubber in which there is incorporated a small amount within the range of 0.1 to 5 parts by weight per 100 parts of rubber, sufficient to inhibit degradation, of N-isopropyl-4-(2-ethyl-n-butoxy)aniline.

9. Sulfur vulcanizable diene rubber in which there is incorporated a small amount within the range of 0.1 to 5 parts by weight per 100 parts of rubber, sufficient to inhibit degradation, of N-isopropyl-4-n-octyloxyaniline.

10. Sulfur vulcanizable diene rubber in which there is incorporated a small amount within the range of 0.1 to 5 parts by weight per 100 parts of rubber, sufficient to inhibit degradation, of N-isopropyl-4-(1-methylheptyloxy)aniline.

11. Vulcanized sulfur vulcanizable diene rubber having incorporated therein a small amount within the range of 0.1 to 5 parts by weight per 100 parts of rubber, sufficient to inhibit degradation, of an antidegradant of the structure

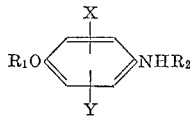

where $R_1$ is a member of a group consisting of an alkyl group of 1 to 12 carbon atoms, cyclohexyl, methylcyclohexyl, cyclopentyl and benzyl, $R_2$ is a secondary alkyl group from the class consisting of 1-methyl-n-propyl, 1-ethyl-n-propyl, 1-methyl-n-butyl and isopropyl and X and Y are members of a group consisting of hydrogen and lower alkyl of 1 to 3 carbon atoms, with the proviso that when $R_2$ is isopropyl, $R_1$ contains at least six carbon atoms.

12. Vulcanized sulfur vulcanizable diene rubber having incorporated therein a small amount within the range of 0.1 to 5 parts by weight per 100 parts of rubber, sufficient to inhibit degradation, of an antidegradant of the structure

where $R_1$ is benzyl and $R_2$ is a secondary alkyl group containing at least four but not more than five carbon atoms.

13. Vulcanized sulfur vulcanizable diene rubber having incorporated therein a small amount within the range of 0.1 to 5 parts by weight per 100 parts of rubber, sufficient to inhibit degradation, of an antidegradant of the structure

where $R_1$ is a higher alkyl group of six to twelve carbon atoms and $R_2$ is a secondary alkyl group containing at least three but not more than five carbon atoms.

14. Vulcanized sulfur vulcanizable diene rubber having incorporated therein a small amount within the range of 0.1 to 5 parts by weight per 100 parts of rubber, sufficient to inhibit degradation, of an antidegradant of the structure

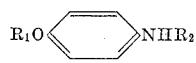

where $R_1$ is a secondary alkyl group of three to twelve carbon atoms and $R_2$ is a secondary alkyl group containing at least four but not more than five carbon atoms.

15. Vulcanized natural rubber having incorporated therein a small amount within the range of 0.1 to 5 parts by weight per 100 parts of rubber, sufficient to inhibit degradation, of 4-methoxy-N-(1'-methyl-n-propyl)aniline.

16. Vulcanized natural rubber having incorporated therein a small amount within the range of 0.1 to 5 parts by weight per 100 parts of rubber, sufficient to inhibit degradation, of 4-n-hexyloxy-N-(1'-methyl-n-propyl)aniline.

17. Vulcanized natural rubber having incorporated therein a small amount within the range of 0.1 to 5 parts by weight per 100 parts of rubber, sufficient to inhibit degradation, of 4-ethoxy-N-(1'-methyl-n-propyl)aniline.

References Cited in the file of this patent

UNITED STATES PATENTS

| | | |
|---|---|---|
| 2,166,223 | Semon | July 18, 1939 |
| 2,300,246 | Chenicek et al. | Oct. 27, 1942 |
| 2,435,411 | Soday | Feb. 3, 1948 |
| 2,651,621 | Hill et al. | Sept. 8, 1955 |
| 2,771,368 | Thompson | Nov. 20, 1956 |
| 2,802,810 | Bill | Aug. 13, 1957 |
| 2,829,121 | Leeper | Apr. 1, 1958 |
| 2,926,155 | Greene | Feb. 20, 1960 |

FOREIGN PATENTS

| | | |
|---|---|---|
| 430,335 | Great Britain | June 11, 1953 |